United States Patent Office.

VINCENT CORDIER, OF PARIS, FRANCE, ASSIGNOR TO JOHN GATLIFF AND CLEMENT DIETRICH.

*Letters Patent No. 82,604, dated September 29, 1868.*

IMPROVED PAINT-OIL.

The Schedule referred to in these Letters Patent and making part of the same.

TO ALL WHOM IT MAY CONCERN:

Be it known that I, VINCENT CORDIER, manufacturer, of 13 Rue Gaillon, Paris, Empire of France, have invented certain Improvements in the Treatment of Oils Obtained from the Distillation of Tar, and in the application of the same to the purposes for which ordinary drying-oils are applicable; and I do hereby declare that the following specification is a description of my invention, sufficient to enable those skilled in the art to practise it.

The said invention relates to a peculiar mode of treating oils obtained from the distillation of tar, such as heavy mineral oils, with a view to the rendering of the same siccative, and applicable, when so prepared, as substitutes for the more costly linseed and other drying-oils at present employed in the manufacture of water-proof fabrics, and for painting, varnishing, and other purposes where drying-oils are required.

In carrying out this invention, it is proposed to render siccative those oils which are obtained from the distillation of tar, (which, for brevity, I shall hereinafter designate as "tar-oils,") not by direct treatment of the oil itself, but by an indirect mode of treatment; that is to say, by admixture therewith, in suitable proportions, of a drying-oil which has been rendered siccative in excess, by treating it with any suitable or well-known ingredient for the purpose. A perfect drying-oil is thus obtained, which may be used in all cases where the more costly boiled linseed and other vegetable drying-oils have hitherto been employed. The linseed or other suitable vegetable oil, (such as rape and hemp-seed-oils, poppy-oil, and others,) is first prepared by rendering it siccative, in any well-known or suitable manner, until it attains a pasty consistency.

The admixture of the pasty drying-oil with the tar-oil should be effected whilst at an elevated temperature, (although it may be accomplished in a cold state,) in the proportion of not less than one-fifth of the linseed or other prepared drying-oil to four-fifths of the tar-oil, if intended to be employed in painting; otherwise, the product would be of too inferior a quality; but the proportion of prepared linseed-oil in the mixture may be increased, if desired.

The linseed or other vegetable oil may be brought to a semi-fluid state, in lieu of to a pasty condition, but, in this case, a greater proportion of siccative oil will require to be mixed with the tar-oil to render it sufficiently siccative.

In preparing siccative tar-oils to be employed in the manufacture of oil-cloth, it is preferred to render the linseed-oil siccative, by treating it with litharge and umber, and to effect the admixture of this oil with the tar-oil in a pasty condition, and in the proportion of one-half of linseed-oil.

Having now described and particularly ascertained the nature of the said invention, and the manner in which the same is or may be used or carried into effect, I would observe, in conclusion, that what I consider to be novel and original, and therefore claim as the invention, is—

The paint-oil herein described, composed in part of mineral oil and in part of vegetable oil, and having the proper quantity of drying-material incorporated, by mixing the litharge or other drier in excess with the linseed or equivalent vegetable oil, and afterwards adding the petroleum or equivalent tar-oil, as herein specified.

In testimony whereof, I have hereunto set my name in presence of two subscribing witnesses.

V. CORDIER.

Witnesses:
F. OLCOTT,
A. H. BRANDON.